(12) United States Patent
Wang et al.

(10) Patent No.: US 11,178,888 B2
(45) Date of Patent: Nov. 23, 2021

(54) PRODUCTION SYSTEM AND METHOD FOR IMPROVING YIELD OF BAYBERRY JUICE

(71) Applicant: CHANGSHA UNIVERSITY OF SCIENCE AND TECHNOLOGY, Hunan (CN)

(72) Inventors: Jianhui Wang, Hunan (CN); Zhimin Cheng, Hunan (CN); Dongmin Liu, Hunan (CN); Yan Wang, Hunan (CN); Shouyao Xiong, Hunan (CN); Jingheng Ning, Hunan (CN); Wen Li, Hunan (CN); Yongsheng Zhang, Hunan (CN); Zhiqiang Hu, Hunan (CN); Yaru Sun, Hunan (CN)

(73) Assignee: CHANGSHA UNIVERSITY OF SCIENCE AND TECHNOLOGY, Changsha (CN)

( * ) Notice: Subject to any disclaimer, the term of this patent is extended or adjusted under 35 U.S.C. 154(b) by 2 days.

(21) Appl. No.: 17/038,942

(22) Filed: Sep. 30, 2020

(65) Prior Publication Data
US 2021/0007373 A1    Jan. 14, 2021

Related U.S. Application Data

(63) Continuation of application No. PCT/CN2020/083227, filed on Apr. 3, 2020.

(30) Foreign Application Priority Data

Apr. 22, 2019  (CN) .......................... 201910324058.4

(51) Int. Cl.
*A23L 2/04*  (2006.01)
*A23N 1/00*  (2006.01)
*B01D 3/40*  (2006.01)

(52) U.S. Cl.
CPC .................. *A23L 2/04* (2013.01); *A23N 1/00* (2013.01); *B01D 3/40* (2013.01); *A23V 2002/00* (2013.01)

(58) Field of Classification Search
CPC .... A23L 2/04; B01D 3/40; B01D 3/38; A23N 1/00
See application file for complete search history.

(56) References Cited

U.S. PATENT DOCUMENTS

2006/0141114 A1* 6/2006 Lang .......................... C12F 3/06
                                                                426/489

FOREIGN PATENT DOCUMENTS

| CN | 202638021 U | 1/2013 |
|---|---|---|
| CN | 104432356 A | 3/2015 |
| CN | 207445627 U | 6/2018 |
| CN | 208121071 U | 11/2018 |
| CN | 108970175 A | 12/2018 |
| CN | 208218803 U | 12/2018 |
| CN | 208301875 U | 1/2019 |
| CN | 110025017 A | 7/2019 |
| WO | 2016059185 A1 | 4/2016 |

* cited by examiner

*Primary Examiner* — John J Norton

(57) ABSTRACT

A production system for improving yield of bayberry juice includes a steam generator, a main body, a feed hopper, an extraction device, a cooling liquid tank and a collection container. A method for improving yield of bayberry juice includes the following steps. Bayberries are selected, soaked, cleaned, squeezed, distilled and condensed. The bayberries are distilled and condensed after ordinary squeezing, which improves the yield of bayberry juice and avoiding the waste of nutrients in the bayberry.

6 Claims, 2 Drawing Sheets

PRODUCTION SYSTEM AND METHOD FOR IMPROVING YIELD OF BAYBERRY JUICE

CROSS-REFERENCE TO RELATED APPLICATIONS

This application is a continuation of International Application No. PCT/CN2020/083227, filed on Apr. 3, 2020, which claims the benefit of priority from Chinese Patent Application No. 201910324058.4, filed on Apr. 22, 2019. The content of the aforementioned applications, including any intervening amendments thereto, is incorporated herein by reference.

TECHNICAL FIELD

The present application relates to a production system and a method for improving yield of bayberry juice.

BACKGROUND

Bayberry contains a variety of organic acids and a rich vitamin C content. Fresh bayberries have an acidic taste, and are capable of increasing acidity of the stomach, so as to digest food and promote appetite.

The bayberry juice is generally obtained by physical squeezing, and however, such method leads to a lower yield. Actually, residues of the squeezed bayberry which are thrown away are still rich in nutrients. Thus, the nutrients in the bayberry are not fully utilized, resulting in waste of nutrients in the bayberry.

SUMMARY OF THE DISCLOSURE

In view of the above problems, an object of the present disclosure is to provide a production system and a method for improving yield of bayberry juice, in which the bayberries are distilled and condensed after ordinary squeezing, thereby improving the yield of bayberry juice and avoiding the waste of nutrients in the bayberries.

Technical solutions of the present disclosure are described as follows.

Provided is a production system for improving yield of bayberry juice, comprising:
 a main body;
 a feed hopper;
 a steam generator;
 a condenser;
 a cooling liquid tank; and
 a collection container;
wherein the main body is provided with an electric actuator chamber, a squeezing chamber and a distillation chamber which are sequentially arranged from top to bottom; an electric control valve assembly is arranged between the squeezing chamber and the distillation chamber;

a first air cylinder is arranged in the electric actuator chamber; the feed hopper is connected to the squeezing chamber; a squeezing plate is connected to an extendable end of the first air cylinder, and the first air cylinder is fixed on an inner surface of the electric actuator chamber; and the squeezing chamber and the electric actuator chamber are divided by the squeezing plate;

a juice outlet pipe is arranged at a bottom of the squeezing chamber which is provided with a solenoid valve; a bottom of the distillation chamber is provided with a steam spray plate which is connected to an outlet of the steam generator via a pipe; a support net is mounted in the distillation chamber and located directly above the steam spray plate, and an end of the distillation chamber is connected with a steam outlet pipeline; an end of the steam outlet pipeline and an end of the juice outlet pipeline are arranged in the condenser; and the cooling liquid tank is communicated with the condenser, and a temperature in the condenser is lowered by a cooling liquid in the cooling liquid tank; a bottom of the extraction device is provided with a collection tube, and an end of the collection tube is set in the collection container.

In some embodiments, the condenser comprises a cover and a cylinder body; the cover is connected to a top of the cylinder body in a sealed manner; a water-cooled support is arranged inside the cylinder body and is cooled by the cooling liquid in the cooling liquid tank; and the end of the steam outlet pipeline and the end of the juice outlet pipeline are arranged inside the cover.

In some embodiments, the water-cooled support comprises a cooling pipe, a plurality of first multiway connectors, a water inlet pipe, a water pump, a cooling branch pipe, a return branch pipe, a second multiway connector and a water outlet pipe;

the first multiway connectors are evenly arranged on the cooling pipe, and the cooling branch pipes are evenly arranged on each of the first multiway connectors; the cooling branch pipes are connected to each other through the return branch pipes; the end of the return branch pipes which are close to a bottom of the condenser is connected to the second multiway connector which is connected to the water outlet pipe; and the cooling pipe is connected to the water inlet pipe, and the water inlet pipe is connected to an outlet of the cooling liquid tank through the water pump; and the water outlet pipe is connected to an inlet of the cooling liquid tank.

In some embodiments, the cooling branch pipes are all inclined downward.

In some embodiments, the electric control valve assembly comprises a second air cylinder, a guide square tube and a valve; the main body is provided with a support frame, and the second air cylinder is fixed on the support frame; the guide square tube is fixed on a side of the main body; the valve is slidably mounted in the guide square tube; the extendable end of the second air cylinder is connected to the valve and drives the valve to move along a direction guided by the guide square tube to make the squeezing chamber and the distillation chamber communicate with or separate from each other.

In some embodiments, a cross section of the squeezing chamber and a cross section of the distillation chamber are square, and a cross section of the valve fits with the cross section of the distillation chamber.

The present disclosure further provides a method for improving yield of bay berry juice, comprising:
 1) selecting, soaking and cleaning bayberries to obtain cleaned bayberries; and feeding the cleaned bayberries into the squeezing chamber through the feed hopper;
 2) squeezing the cleaned bayberries by the squeezing plate to obtain first bayberry juice and bayberry residues; and collecting the first bayberry juice in the collection container;
 3) distilling the bayberry residues by the steam generator to obtain bayberry steam; and
 4) condensing the bayberry steam in the condenser to obtain second bayberry juice from the bayberry residues and collect the second bayberry juice in the collection container.

The present invention has the following beneficial effects.

The bayberries are distilled and condensed after ordinary squeezing, which improves the yield of bayberry juice and avoiding the waste of nutrients in the bayberry.

The production system of the present invention has a high degree of automation and can be used for standardized production, in which automatic squeezing, distillation and condensation of bayberries can be realized. In addition, manual operation is not involved in the production process of the bayberry juice, which renders the production process clean and high-efficient.

The method of the present invention is simple in operation and practical in use, and thus has broad market prospects and high economic benefits.

Figure 1:
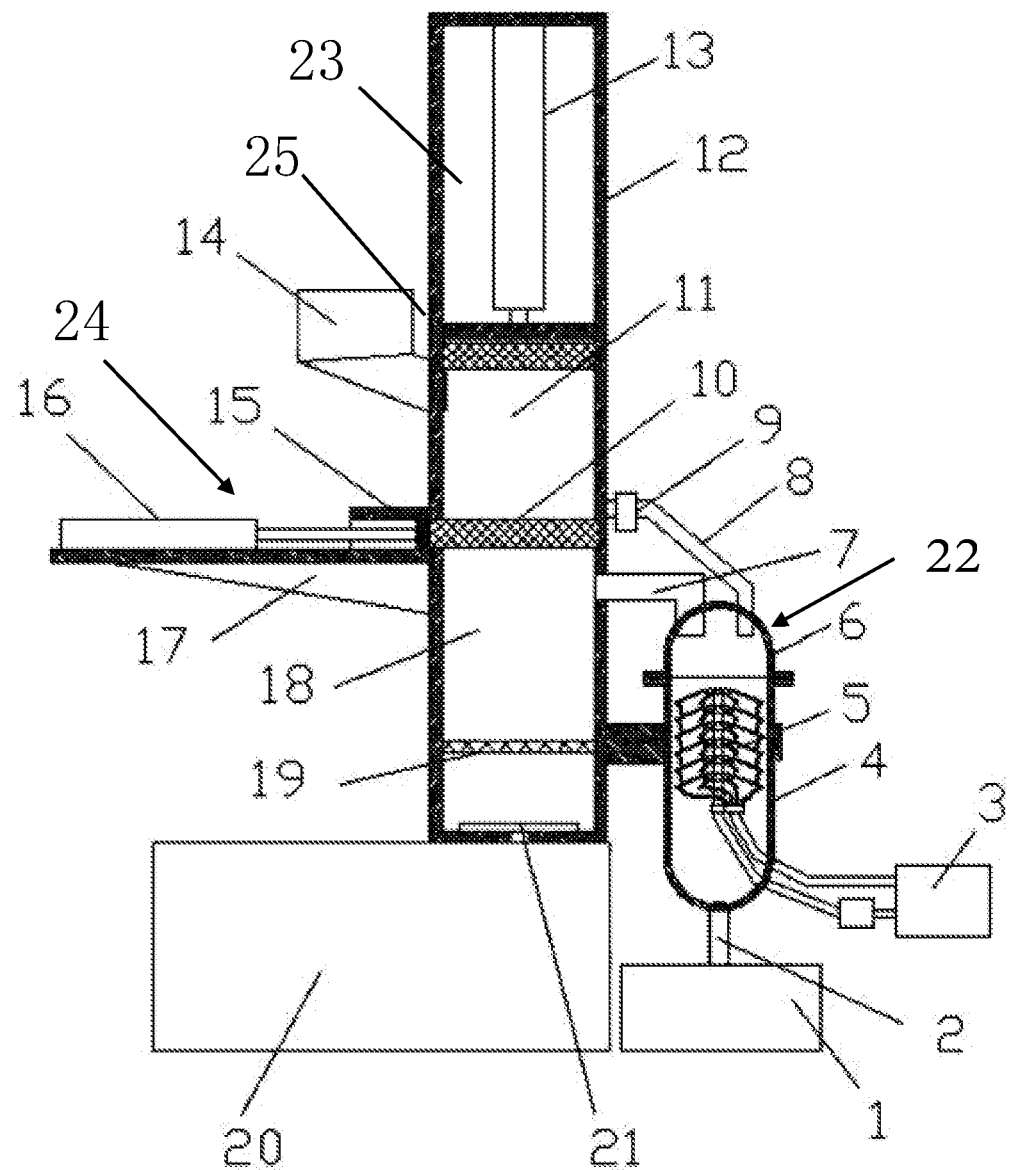
FIG. 1 is a schematic diagram of a production system for improving yield of bayberry juice according to an embodiment of the present disclosure.

In the drawings, 1, collection container; 2, collection pipe; 3, cooling liquid tank; 4, cylinder body; 5, water-cooled support; 6, cover; 7, steam outlet pipeline; 8, juice outlet pipe; 9, solenoid valve; 10, valve; 11, squeezing chamber; 12, main body; 13, first air cylinder; 14, feed hopper; 15, guide square pipe; 16, second air cylinder; 17, support frame; 18, distillation chamber; 19, support net; 20, steam generator; 21, steam spray plate; 22, condenser; 23, electric actuator chamber; 24, electric control valve assembly; 25, squeezing plate; 501, cooling branch pipe; 502, first multiway connector; 503, return branch pipe; 504, cooling pipe; 505, second multiway connector; 506, water outlet pipe; 507, water inlet pipe; 508, water pump.

DETAILED DESCRIPTION OF EMBODIMENTS

The present disclosure will be further described in detail with reference to the embodiments and the accompanying drawings, from which technical solutions of the present disclosure will be better understood. These embodiments are for illustrative purposes, and are not intended to limit the scope of the present disclosure.

Figure 2:
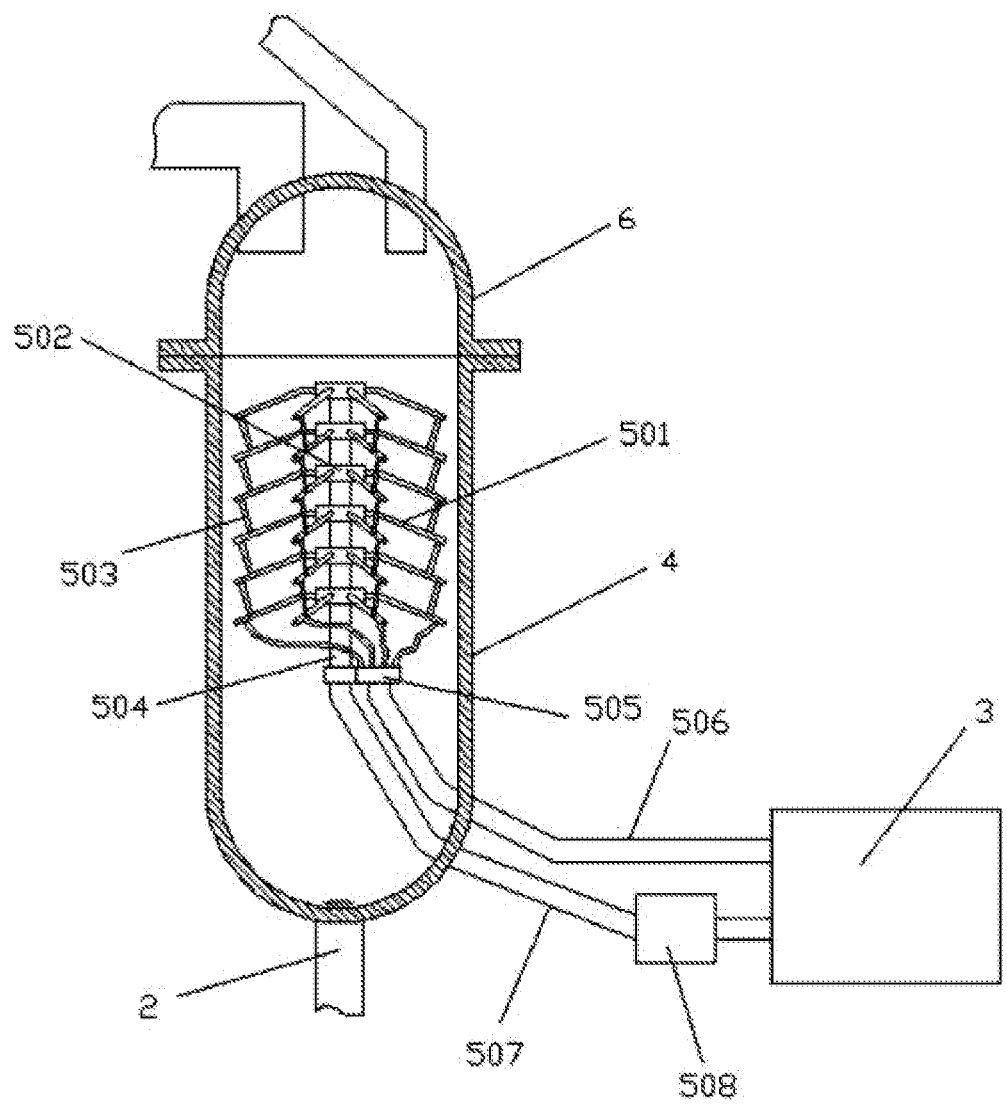
FIG. 2 is a schematic diagram of a condenser according to an embodiment of the present disclosure.

As shown in FIGS. 1-2, illustrated is a production system for improving yield of bayberry juice, including a main body 12, a feed hopper 14, a steam generator 20, a condenser 22, a cooling liquid tank 3 and a collection container 1.

The main body 12 is provided with an electric actuator chamber 23, a squeezing chamber 11 and a distillation chamber 18 which are sequentially arranged from top to bottom. An electric control valve assembly 24 is arranged between the squeezing chamber 11 and the distillation chamber 18.

A first air cylinder 13 is arranged in the electric actuator chamber 23; the feed hopper 14 is connected to the squeezing chamber 11; a squeezing plate 25 is connected to an extendable end of the first air cylinder 13, and the first air cylinder 13 is fixed on an inner surface of the electric actuator chamber 23. The squeezing chamber 11 and the electric actuator chamber 23 are divided by the squeezing plate 25. A juice outlet pipe 8 is arranged at a bottom of the squeezing chamber 11 and is provided with a solenoid valve 9. A bottom of the distillation chamber 18 is provided with a steam spray plate 21 which is connected to an outlet of the steam generator 20 via a pipe. A support net 19 is mounted in the distillation chamber 18 and located directly above the steam spray plate 21, and an end of the distillation chamber 18 is connected to a steam outlet pipeline 7. An end of the steam outlet pipeline 7 and an end of the juice outlet pipeline 8 are arranged in the condenser 22. The cooling liquid tank 3 is communicated with the condenser 22, and the temperature in the condenser 22 is lowered by a cooling liquid in the cooling liquid tank 3. A bottom of the condenser 22 is provided with a collection tube 2, and an end of the collection tube 2 is set in the collection container 1.

In some embodiments, the condenser 22 includes a cover 6 and a cylinder body 4. The cover 6 is connected to a top of the cylinder body 4 in a sealed manner. A water-cooled support 5 is arranged inside the cylinder body 4 and is cooled by the cooling liquid in the cooling liquid tank 3. The end of the steam outlet pipeline 7 and the end of the juice outlet pipeline 8 are arranged inside the cover 6.

In some embodiments, the water-cooled support 5 includes a cooling pipe 504, a plurality of first multiway connectors 502, a water inlet pipe 507, a water pump 508, a plurality of cooling branch pipes 501, a plurality of return branch pipes 503, a second multiway connector 505 and a water outlet pipe 506. The first multiway connectors 502 are evenly arranged on the cooling pipe 504. The cooling branch pipes 501 are evenly distributed at each of the first multiway connectors 502. The cooling branch pipes 501 are connected to each other through the return branch pipes 503. The end of each of the return branch pipes 503 which are close to a bottom of the condenser is connected to the second multiway connector 505 which is connected to the water outlet pipe 506. The cooling pipe 504 is connected to the water inlet pipe 507, and the water inlet pipe 507 is connected to an outlet of the cooling liquid tank 3 through the water pump 508; and the water outlet pipe 506 is connected to an inlet of the cooling liquid tank 3.

In some embodiments, the cooling branch pipes 501 are all inclined downward.

In some embodiments, the electric control valve assembly 24 includes a second air cylinder 16, a guide square tube 15 and a valve 10. The main body 12 is provided with a support frame 17, and the second air cylinder 16 is fixed on the support frame. The guide square tube 15 is fixed on a side of the main body 12. The valve 10 is slidably mounted in the guide square tube 15. The extendable end of the second air cylinder 16 is connected to the valve 10 and drives the valve 10 to move along a direction guided by the guide square tube 15 to make the squeezing chamber 11 and the distillation chamber 18 communicate with or separate from each other.

In some embodiments, the squeezing chamber 11 and the distillation chamber 18 are square, and sides of the valve 10 fit with inner walls of the distillation chamber 18.

As shown in FIGS. 1-2, the specific operation of the production system is described as follows.

Bayberries are fed into the feed hopper 14. The extendable end of the first air cylinder 13 in the electric actuator chamber 23 extends downward, and drives the squeezing plate 25 to move downward to squeeze the bayberries. The bayberry juice flows through the juice outlet pipe 8 at the bottom of the squeezing chamber 11 to the cover 6, and then to the cylinder body 4 and finally to the collection container 1 via the collection pipe 2.

After the squeezing is completed, the extendable end of the second air cylinder 16 of the electric control valve assembly 24 retracts, which drives the valve 10 to move outwardly to allow the squeezing chamber 11 and the distillation chamber 18 to communicate with each other, so that the squeezed bayberry residues fall onto the support net 19 in the distillation chamber 18. Then the extendable end of the second air cylinder 16 in the electric control valve assembly 24 extends to drive the valve 10 to move inwardly, so that the squeezing chamber 11 and the distillation chamber 18 are separated by the valve 10. Then, the steam generator 20 is turned on to generate steam to enter the distillation chamber 18 through the steam spray plate 21, so that the nutrients in the bayberry residues on the support net 19 enter the cylinder body 4 along with the steam through the air outlet pipe 7 in the distillation chamber 18. The steam containing the nutrients of the bayberry is condensed into a liquid in the cylinder body 4 by the water-cooled support 5. The condensed liquid flows into the collection container 1 through the collection pipe 2, thereby obtaining the bayberry juice.

The present disclosure further provides a method for improving yield of bayberry juice, including the following steps.

1) Bayberries are selected, soaked and cleaned to obtain cleaned bayberries; and the cleaned bayberries are fed into the squeezing chamber through the feed hopper.

2) The cleaned bayberries are squeezed by the squeezing plate to obtain first bayberry juice and bayberry residues; and the first bayberry juice is collected in the collection container.

3) The bayberry residues are distilled by the distillation chamber to obtain bayberry steam.

4) The bayberry steam is condensed in the condenser to obtain second bayberry juice from the residues and collect it in the collection container.

It should be noted that terms such as "include" and "comprise" used herein are only intended to indicate the presence of features, steps, operations, devices and/or a combination thereof.

Above-mentioned embodiments are only for illustrative purposes, and are not intended to limit the scope of the present disclosure. Any improvement, change, modification without departing from the spirit of the present disclosure shall fall within the scope of the present disclosure.

What is claimed is:

1. A production system for improving yield of bayberry juice, comprising:
    a main body;
    a feed hopper;
    a steam generator;
    a condenser;
    a cooling liquid tank; and
    a collection container;
    wherein the main body is provided with an electric actuator chamber, a squeezing chamber and a distillation chamber which are sequentially arranged from top to bottom; an electric control valve assembly is arranged between the squeezing chamber and the distillation chamber;
    a first air cylinder is arranged in the electric actuator chamber; the feed hopper is connected to the squeezing chamber; a squeezing plate is connected to an extendable end of the first air cylinder, and the first air cylinder is fixed on an inner surface of the electric actuator chamber; and the squeezing chamber and the electric actuator chamber are divided by the squeezing plate;
    a juice outlet pipe is arranged at a bottom of the squeezing chamber and is provided with a solenoid valve; a bottom of the distillation chamber is provided with a steam spray plate which is connected to an outlet of the steam generator via a pipe; a support net is mounted in the distillation chamber and located directly above the steam spray plate, and an end of the distillation chamber is connected with a steam outlet pipeline; an end of the steam outlet pipeline and an end of the juice outlet pipeline are arranged in the condenser; and
    the cooling liquid tank communicates with the condenser, and a temperature in the condenser is lowered by a cooling liquid in the cooling liquid tank; a bottom of the condenser is provided with a collection tube, and an end of the collection tube is arranged in the collection container.

2. The production system of claim 1, wherein the condenser comprises a cover and a cylinder body; the cover is connected to a top of the cylinder body in a sealed manner; a water-cooled support is arranged inside the cylinder body and is cooled by the cooling liquid in the cooling liquid tank; the end of the air outlet pipeline and the end of the juice outlet pipeline are arranged inside the cover.

3. The production system of claim 2, wherein the water-cooled support comprises a cooling pipe, a plurality of first multiway connectors, a water inlet pipe, a water pump, a cooling branch pipe, a return branch pipe, a second multiway connector and a water outlet pipe;
    the first multiway connectors are evenly arranged on the cooling pipe, and the cooling branch pipes are evenly arranged on each of the first multiway connectors; the cooling branch pipes are connected to each other through the return branch pipes; the end of the return branch pipes which are close to a bottom of the condenser is connected to the second multiway connector which is connected to the water outlet pipe; and
    the cooling pipe is connected to the water inlet pipe, and the water inlet pipe is connected to an outlet of the cooling liquid tank through the water pump; and the water outlet pipe is connected to an inlet of the cooling liquid tank.

4. The production system of claim 3, wherein the cooling branch pipes are all inclined downward.

5. The production system of claim 3, wherein the electric control valve assembly comprises a second air cylinder, a guide square tube and a valve; the main body is provided with a support frame, and the second air cylinder is fixed on the support frame; the guide square tube is fixed on a side of the main body;
    the valve is slidably mounted in the guide square tube; the extendable end of the second air cylinder is connected to the valve and drives the valve to move along a direction guided by the guide square tube to make the squeezing chamber and the distillation chamber communicate with or separate from each other.

6. The production system of claim 5, wherein a cross section of the squeezing chamber and a cross section of the distillation chamber are square, and a cross section of the valve fits with the cross section of the distillation chamber.

* * * * *